3,528,671
HYDRAULIC APPARATUS FOR VARYING THE GROUND CLEARANCE OF LAND VEHICLES NOT SUPPORTED ON RAILS
Helmut Hausenblas, Kassel, and Dieter Bachmann, Elgershausen, Kassel, Germany, assignors to Rheinstahl Henschel A.G., Kassel, Germany, a corporation of Germany
Filed Sept. 29, 1967, Ser. No. 671,834
Claims priority, application Germany, Oct. 4, 1966, R 44,275
Int. Cl. B60g 23/00
U.S. Cl. 280—6                                              3 Claims

ABSTRACT OF THE DISCLOSURE

This invention relates to a hydraulic apparatus for varying the ground clearance of a non-railway type land vehicle having four adjustable supporting means, which comprises a theoretical value transmitter means, a height regulator, and a second regulator means which determines, according to amount and sign, the difference of the summation values of the loads on the supporting means, being taken in diagonals connecting the supporting means, and compensates the difference to the theoretical value of zero by controlling hydraulic fluid supplied to the supporting means.

---

Figure 1:
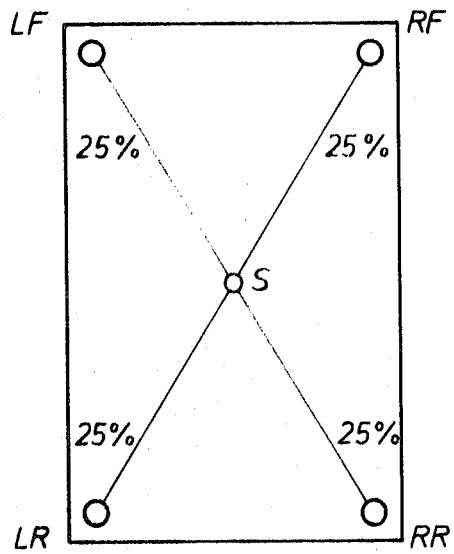

The present invention relates to a hydraulic lifting and lowering mechanism, for example, for purposes of varying the ground clearance of land vehicles which do not run on rails and, more specifically, having a structure such that the vehicle is supported on the ground at four points by means of hydraulic cylinders of the lifting and lowering mechanism, and by means of spring members. The lifting and lowering mechanism can be used only for a vehicle which is resting on an essentially planar surface, i.e., it can not be used while the vehicle is in motion. The vehicle either may be of the type having four wheels or more than two wheels on each side thereof, irrespective of whether the vehicle is mounted on wheels or is of the crawler-type or track-laying type.

In vehicles having more than two wheels on each side thereof, adjacent wheel suspensions each are connected in groups, for example by means of mechanical compensating devices or other corresponding means, as for instance hydraulic means, in a manner such that each side of the vehicle has two supporting points, i.e., there is a total of only four supporting points for the entire vehicle superstructure.

In connection with the lifting and lowering of the vehicle superstructure it is known to utilize separate supply means for hydraulic fluid to each of the four aforementioned supporting points, i.e., for the associated hydraulic cylinders. A separate pump which may be connected and/or disconnected as desired, and a return line, which is adapted to be opened and/or closed as desired, may be provided for each supporting point and its associated hydraulic cylinder. It is also conceivable, however, to provide for fewer than four parallelly-operating pumps for all of the supporting points and hydraulic cylinders in which case the supply and the discharge of the hydraulic fluid to the four cylinders is controlled, for example, by means of control or pilot valves or proportioning valves.

The disadvantage of the known mechanism is that the vehicle is supported on the ground in a statically uncertain manner by the four supporting points. If it is assumed at the outset, for purposes of simplification, that the center of gravity of the vehicle is located precisely in the center of the rectangle determined by the four supporting points and is so adjusted with the ground clearance $d_1$ that all of the four supporting points are subjected to an identical load, it is possible, during the lifting and/or lowering operation to a different ground clearance $d_2$ as a result of non-uniformity in the supply and/or discharge of the hydraulic fluid to and/or from the four hydraulic cylinders, which is either unavoidable or is brought about unintentionally and/or intentionally, that the vehicle may have the desired new ground clearance $d_2$ after completion of the lifting and/or lowering operation but that the four supporting points are subjected to an uneven load. This possibility exists due to the fact that the spring elements of the vehicle are mounted between the lower ends of the hydraulic operating or servocylinders and the associated wheels and/or wheel groups. It is, therefore, entirely possible that, for example, the right front wheel and the left rear wheel, and/or the corresponding wheel groups, may support a greater portion and the other two wheels, and/or wheel groups, might support a smaller portion of the weight of the vehicle. This is undesirable insofar as the driving behavior of the vehicle is concerned.

It also is known to effect adjustment of the vehicle with a hoisting or lifting unit to the new ground clearance with the aid of height-regulating means which measure in each case the actual value of the ground clearance at the four supporting points, compare this value with the theoretical value and/or values having been determined, and then will cause the actual and the theoretical values to coincide by appropriately regulating the supply and/or discharge of the hydraulic medium. This known device also involves the disadvantage outlined above that an uneven load on the four supporting points may possibly result.

A known solution which has been proposed for purposes of preventing static non-uniformity consists in that a transition to a statically definite three-point support is attained during the lifting and lowering operation by interconnecting, for example, the hydraulic cylinders of the two rear supporting points, or of the two forward supporting points, by means of a hydraulic line, and by interrupting this connection again when the lifting and/or lowering operation has been completed. This system does satisfy the existing requirements if the center of gravity of the vehicle superstructure is located centrally but not if the center of gravity is slightly displaced laterally. This is so because in a four-point support or type of positioning, the moment resulting from the eccentricity of the center of gravity is absorbed by an uneven load on the supporting points of both the front and the rear pair of supporting points (left/right). With the change or transition to the three-point support during the lifting and/or lowering operation, on the other hand, the entire moment is absorbed only by an uneven load on the two supporting points not being connected with each other transversely to the driving direction. This situation does not change even when the transverse connection is interrupted again immediately after the completion of the lifting and/or lowering operation. The result is that, in the example chosen and discussed above, the right forward supporting point is subjected to a greater load at the conclusion of the lifting or lowering operation than would be the case in a vehicle without a hoisting or lifting unit and with the normal uniform adjustment of the spring elements. This is again undesirable from the point of view of driving characteristics.

The present invention eliminates the disadvantages and drawbacks of the known devices and improves on the height-regulating means in that a uniform load distribution on the four supporting points is attained in every case after the completion of a lifting or lowering operation.

The present invention further assures that even in case the center of gravity is positioned eccentrically, the load distribution after each lifting and lowering operation is precisely as it would be in a vehicle without a hoisting or lifting unit.

In the present invention, the height-adjusting or regulating means employed for the lifting and lowering operation is complemented by a second regulator means whereby the desired load distribution between the four supporting points may be adjusted. For this purpose, the additional regulator determines the sums of the loads, measured as hydraulic pressures in the servo cylinders for the two pairs of operating cylinders positioned diagonally opposite each other, and compares the measured values thus obtained with each other. It may be shown that the desired load distribution is, in fact, present when the two aforementioned diagonal summation values are equal with respect to each other or, in other words, when the difference of these two values equals zero. The additional regulator proposed by the present invention operates in a manner such that it determines the difference of the two aforementioned diagonal summation values according to amount and sign and balances or adjusts it to the theoretical value "zero" by correspondingly controlling the supply or discharge of the hydraulic fluid to the respective servomotors of the two diagonals. This balance to zero will yield at all times the desired load distribution between the four supporting points and it is not necessary that the value of the weight of the vehicle superstructure and the location of the center of gravity thereof be known. This is significant since these values may change with, for example, a variation in the loading condition of the vehicle.

Since the two regulators cannot be simultaneously connected or switched to the regulating units, the present invention further proposes that they are rendered operative alternately within short intervals by means of a timer, for example a rectangular signal transmitter. After the new ground clearance $d_2$ and the desired load distribution between the four supporting points have been achieved, neither of the two regulators will supply an output signal to the regulating units any longer; the system remains inoperative, and the regulating operation is completed.

The invention is not limited to the case in which the theoretical value transmitter for the height of the vehicle supplies the same value for all four of the supporting points. In a case where, due to different theoretical values of the vehicle height for the four supporting points, also a desired longitudinal and/or transverse inclination may be required, the theoretical value transmitter is so constructed, in accordance with a further expansion of the present invention concept that, in any desired inclination of the vehicle, the four theoretical or desired values of the four supporting points will not contradict or be inconsistent with the desired distribution of the supporting forces upon the two diagonals.

For the purpose of further describing the construction of the invention, the special case should be considered where the four supporting elements are similarly constructed and are secured to the vehicle superstructure at the same height; in other words, so that the four mounting points of the supporting elements are positioned in a single plane at the vehicle superstructure. This raises the requirements that the four theoretical values of the position relative to the height of the vehicle superstructure be supplied in such an adaptation with respect to each other that even in any desired inclination of the vehicle superstructure and with the afore-described load distribution to the four supporting points, they will correspond to a position of the four mounting points of the supporting elements in one plane. In this simple case, the condition also may be formulated in a manner such that the sums of the theoretical height values being taken in the diagonals should at all times be the same with regard to each other.

Figure 3:
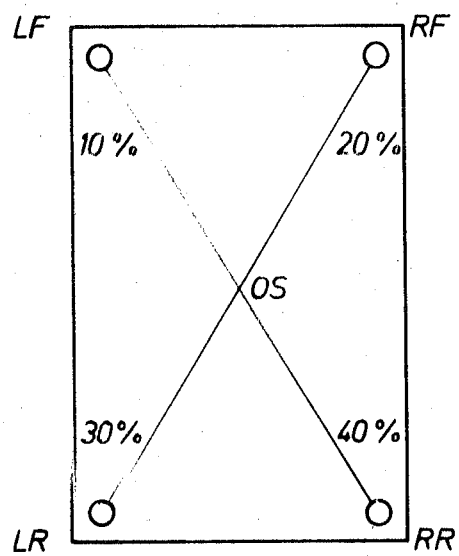
Figure 4:
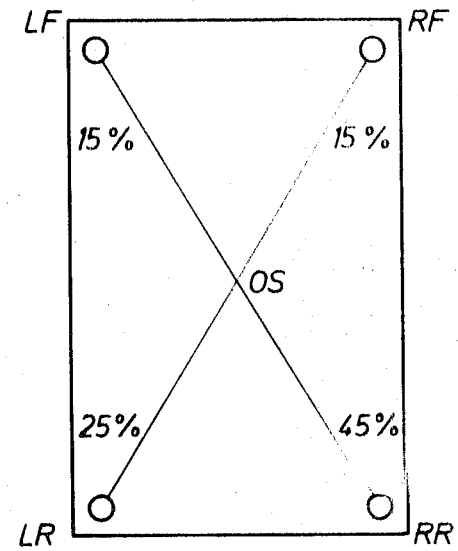
Figure 5:
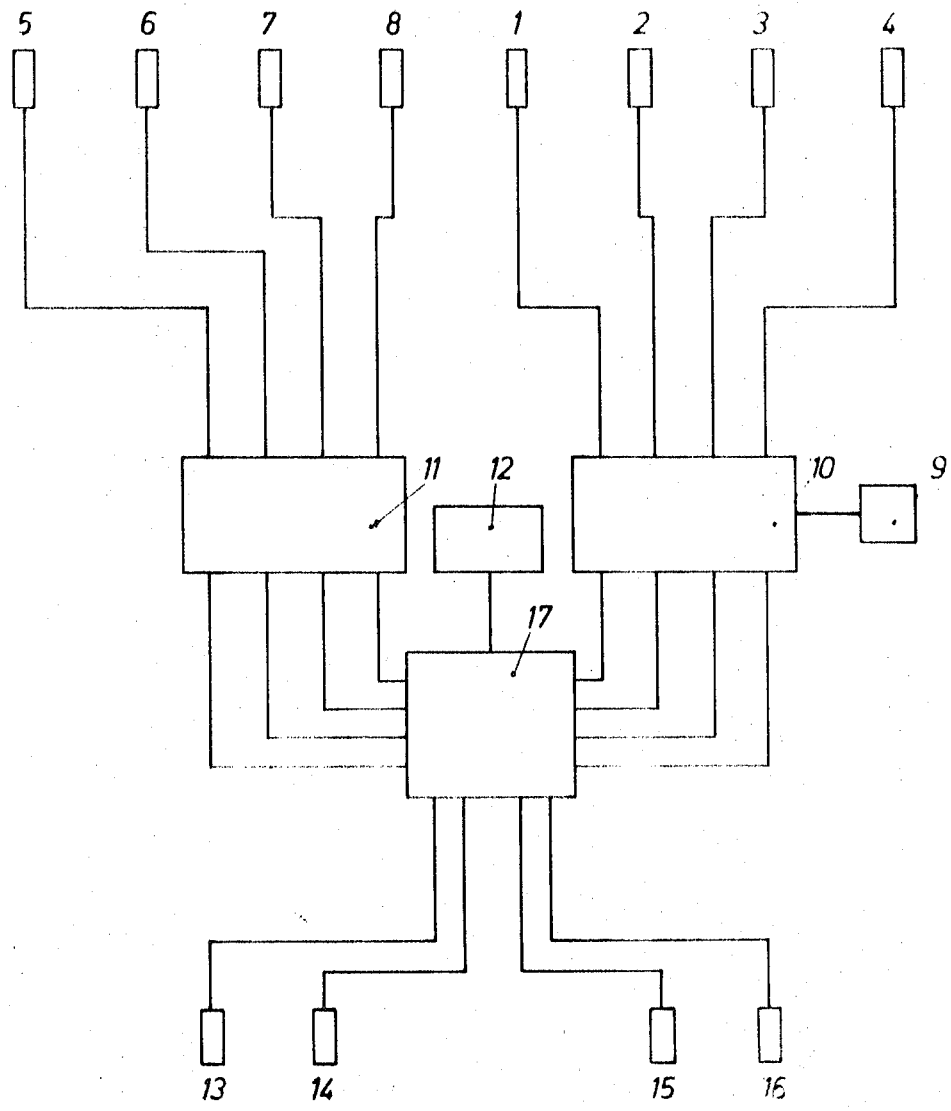

The invention will be further illustrated by reference to the accompanying drawings in which one embodiment of the invention is shown and wherein FIGS. 1 to 4 illustrate the load distribution in a vehicle having the center of gravity thereof positioned centrally and eccentrically, FIG. 5 schematically illustrates the hydraulic lifting and lowering mechanism, and FIGS. 6, 7, and 8 each illustrate one detail of the hydraulic lifting and lowering mechanism.

Referring to FIG. 1, the distribution of the load to the four supporting points LF=left front, LR=left rear, RF=right front, and RR=right rear, for a vehicle whose center of gravity S is positioned centrally is shown. In other words, the center of gravity is in the point of intersection of the diagonals which connect the four supporting points. All of the four supporting points are then subjected to the same load, which is desired for reasons involving driving characteristics. The figures near the four supporting points indicate the load of the respective supporting points in percent of the spring-suspended or spring-mounted vehicle weight. In this case, the sum of the two supporting forces for each of the two diagonals is 50 percent, i.e., identical for both diagonals.

Figure 2:
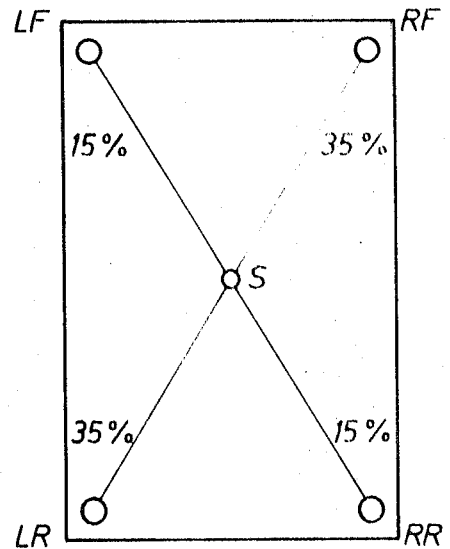

FIG. 2 shows a different load distribution, from among the many possible load distributions according to FIG. 1, to the four supporting points which is not desirable, however, for reasons of the vehicle driving characteristics. In this case, the sums of the supporting forces for the two diagonals, being 30 percent and 70 percent, respectively, are different from each other.

FIGS. 3 and 4 are illustrations corresponding to FIGS. 1 and 2 where the center of gravity S is positioned eccentrically. Using as a basis the case of FIG. 1, it was assumed for the illustration of FIG. 3 that the center of gravity is laterally displaced toward the right to such an extent that the two right-hand supporting points RF and RR must each support 5 percent more weight, and the two left hand supporting points LF and LR each must support 5 percent less. The displacement of the center of gravity toward the rear in the longitudinal vehicle direction is assumed to be such that the two front supporting points LF and RF must each support or carry 10 percent less weight, and the two rear supporting points LR and RR must each support 10 percent more weight. In the condition of FIG. 3, which is desirable from the point of view of driving characteristics, the sums of the supporting forces for each of the two diagonals is 50 percent each, i.e., they are identical with respect to each other. On the other hand, in the condition of FIG. 4, which is not desirable from the point of view of driving characteristics, the sums of the supporting forces for both diagonals, being 40 percent and 60 percent, respectively, are different from each other.

FIG. 5 schematically illustrates the hydraulic lifting and lowering mechanism. Reference numerals 1 to 4 therein indicate the height-measuring members, while reference numerals 5 to 8 indicate the pressure-measuring members at the four supporting points LF, RF, LR, and RR. Reference numeral 9 identifies the theoretical value transmitter for the height adjustment and reference numeral 10 identifies the known height-regulating means, or height regulator. Reference numeral 11 designates the additional regulator, reference numeral 12 identifies the timer which may supply, for example, alternately positive and negative rectangular signals; reference numerals 13 to 16 designate the operating or servo cylinders at the four supporting points, and reference numeral 17 designates the switching device which switches, according to the signals of the timer 12, alternately the signals of the two regulators 10 and 11 to the servo cylinders 13 to 16.

Figure 6:
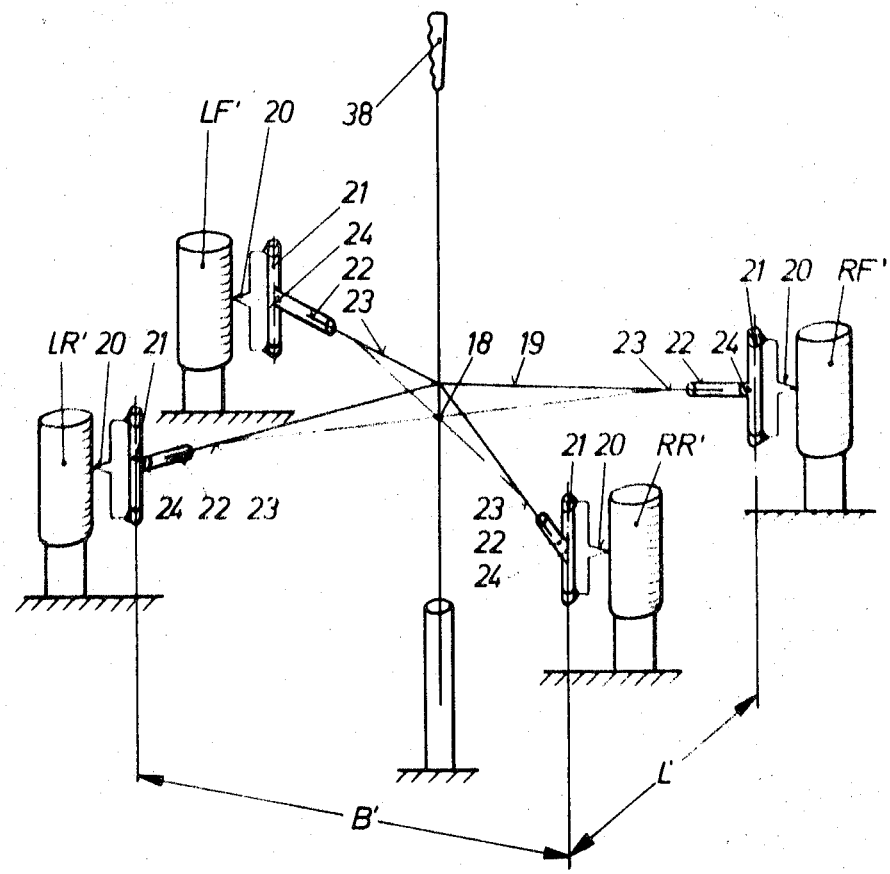

FIG. 6 is a schematic illustration of a theoretical value transmitter for the height position of the vehicle, including the longitudinal and transverse inclinations thereof, which is so constructed and arranged that the four theoretical values of the height adjustment of the vehicle superstructure are indicated in such coordination with respect to each other that they will correspond to a position of the four fastening points of the supporting elements at the vehicle superstructure in a single plane, even in the case of any desired inclination of the vehicle superstructure and with the afore-described distribution of the load to the four supporting points. This condition is satisfied in that four potentiometers LF', LR', RF' and RR' represent, in the mutual position thereof and also in the position of the taps thereof, a geometrically similar image of the four supporting points LF, LR, RF, and RR, and the distances B' and L' proportionally correspond to the distances of the supporting points on the vehicle in the transverse and longitudinal directions, respectively. The lower end points of the four potentiometers correspond to the points of attachment of the supporting elements at the vehicle superstructure, which are assumed to be telescopically operating to an adequate extent and, further, to be positioned in a single plane. The plane extending through the four potentiometer taps corresponds to the ground surface upon which the vehicle is supported by means and with the aid of the supporting elements thereof. A uniform and simultaneous lowering and/or lifting movement of the four supporting elements is initiated by depressing or lifting, respectively, the starting handle or hand lever 38. Reference numeral 18 represents the center of rotation of the hand lever 38. The movement of the hand lever 38 is transmitted, by means of the transmitting linkage or rod system 19 being rigidly connected to and by way of the joints 24 and the connecting elements 22/23, to the guides 21 of the taps 20, and therewith to the potentiometers LF', LR', RF', and RR'. It is essential that the joints 24 be positioned in a single plane regardless of the position of the hand lever 38, thus representing a perfect reduced image of the road surface as presupposed hereinabove.

Figure 7:
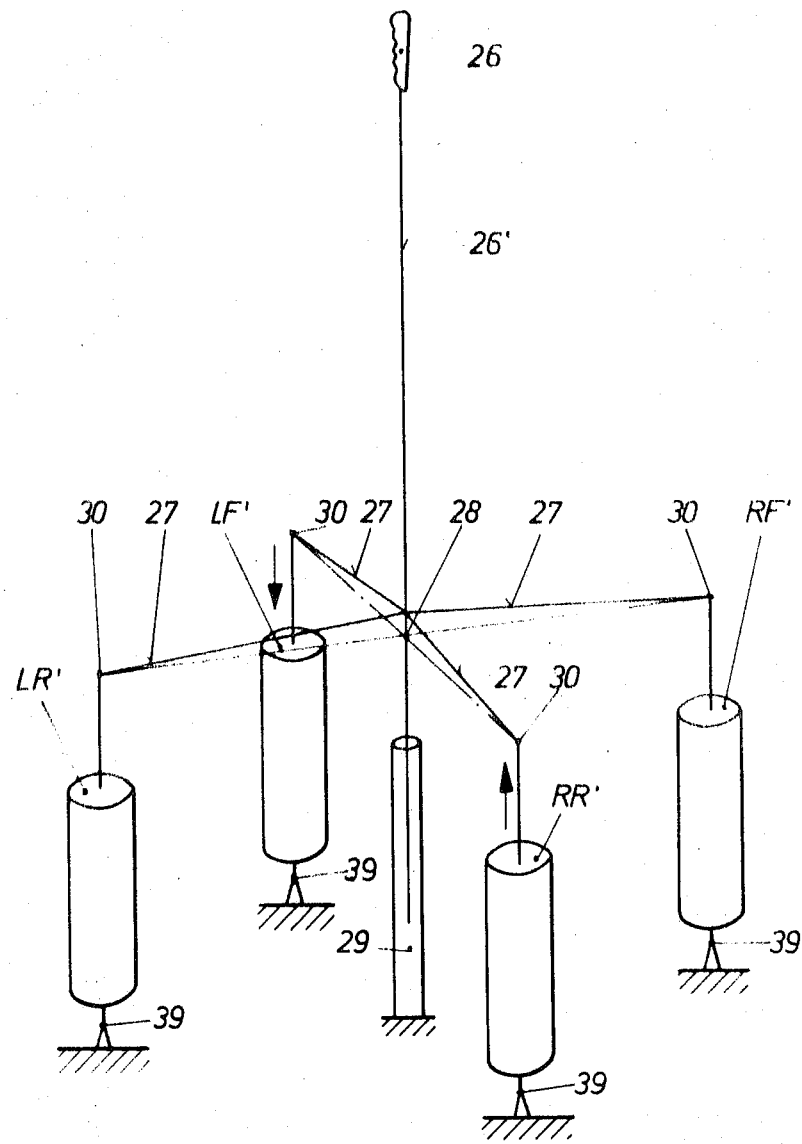

FIG. 7 illustrates another embodiment of a theoretical value transmitter which is simpler in the mechanical construction thereof than the embodiment shown in FIG. 6 but which does have certain defects as compared to the theoretical transmitter described above when adjusting or setting longitudinal or transverse inclinations. Since the supporting elements at the vehicle frequently are not constructed in a manner such that the wheels or groups of wheels being supported or carried thereby move precisely vertically relative to the vehicle superstructure when the vehicle is horizontally positioned, which condition has, however, been presupposed in the construction according to FIG. 6, there generally exists also certain defects or errors as compared to the ideal image. It, therefore, would appear that the theoretical value transmitter according to FIG. 7 is usable in many instances despite the deficiencies it contains, and this particular construction is preferred over that of FIG. 6 because of the mechanically simpler and more certain operating characteristics thereof.

Here again, reference symbols LF', LR', RF', and RR' identify the potentiometers. Reference numeral 26 designates the handle with the aid of which all of the requirement movements are initiated; reference numeral 28 defines the center of rotation of the lever 26'; reference numeral 29 identifies the mounting which prevents rotations of the hand lever 26', and reference numeral 27 represents the connecting linkage, being in operative engagement with the element 26', to the potentiometers LF', LR', RF', and RR' which are adapted to move between the joints 30 and 39.

Figure 8:
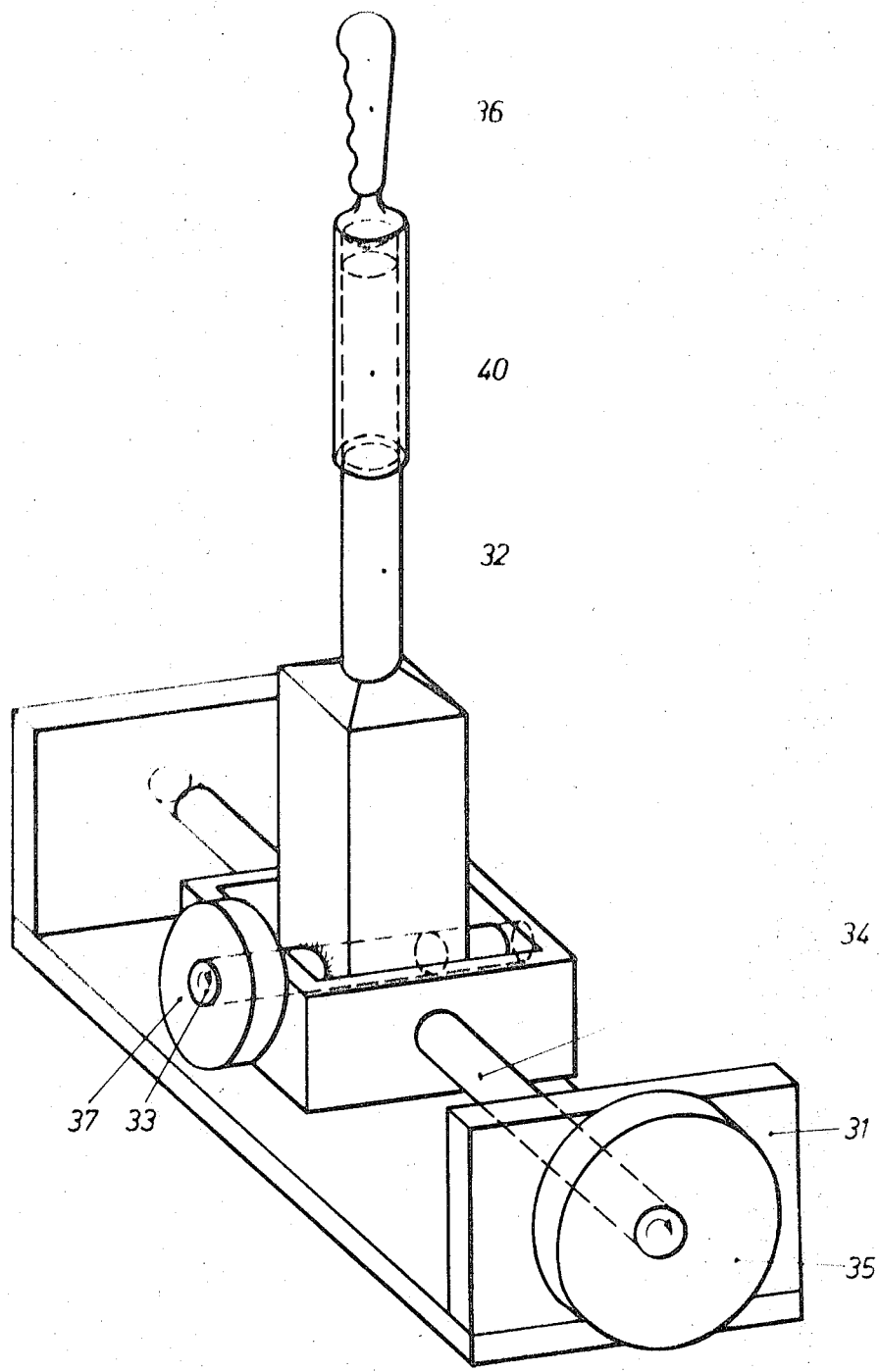

In place of the four linear potentiometers shown in FIGS. 6 and 7, it also is possible to provide, as shown in FIG. 8, one linear potentiometer 40 for the theoretical value supply of the pure height adjustment, and two rotary potentiometers 35 and 37 for the longitudinal and transverse inclinations. The dimensions of the potentiometers and the connection thereof with respect to each other, which have not been illustrated, are so chosen herein that the conditions which are apparent from the description of FIG. 6 are maintained. The structural elements employed in the embodiment of FIG. 8 are as follows: reference numeral 36 identifies the handle; reference numeral 40 is the linear potentiometer; reference numeral 32 indicates the hand lever which transmits the inclining or tilting movements as rotations to the corresponding axles 33 and 34 of the rotary potentiometers 35 and 37, and reference numeral 31 designates the frame.

It will be obvious to those skilled in the art that many modifications may be made within the scope of the present invention without departing from the spirit thereof, and the invention includes all such modifications.

What is claimed is:

1. A hydraulic apparatus for varying the ground clearance of a non-railway type land vehicle comprising in combination, a vehicle, four spaced adjustable supporting means on said vehicle arranged to define two pairs of diagonally opposite supporting means, said supporting means each including a hydraulically operated means, a height measuring means operatively associated with each of said supporting means, a pressure measuring means operatively associated with each of said supporting means, a height regulator connected with said height measuring means for adjusting said supporting means to a desired ground clearance by controlling the supply or discharge of hydraulic fluid to said supporting means, a theoretical value transmitter means connected with said height regulator, and a second regulator connected to said pressure measuring means, said second regulator determining, according to amount and sign, the difference of the summation values of the loads on said two pairs of diagonally opposite supporting means, and adjusting the difference to the theoretical value of zero by controlling the supply or discharge of hydraulic fluid to said supporting means.

2. Apparatus as defined in claim 1 including timing means and switching means controlled thereby operatively connected with said height regulator and said second regulator for rendering said regulators operative alternately within short time intervals.

3. Apparatus as defined in claim 1 wherein the vehicle has a required inclination relative to the ground and the theoretical value transmitter means supplies four theoretical values for the four supporting means at any desired inclination of the vehicle in a manner such that they will not be inconsistent with the desired distribution of supporting forces upon the two pairs of diagonally opposite supporting means.

References Cited

UNITED STATES PATENTS

| | | |
|---|---|---|
| 3,264,008 | 8/1966 | Allinquant. |
| 3,191,954 | 6/1965 | Schuetz. |
| 3,183,016 | 5/1965 | Gustafsson _____ 280—6.1 |

PHILIP GOODMAN, Primary Examiner